United States Patent [19]

Dschida

[11] Patent Number: 4,926,908
[45] Date of Patent: May 22, 1990

[54] PRESSURE RELIEF AND VACUUM VENT VALVE

[75] Inventor: Otto Dschida, Stillman Valley, Ill.

[73] Assignee: Sundstrand Corporation, Rockford, Ill.

[21] Appl. No.: 795,879

[22] Filed: Nov. 7, 1985

[51] Int. Cl.$^5$ ............................................. F16K 24/00
[52] U.S. Cl. .................................... 137/846; 137/599.2
[58] Field of Search ................ 137/599.2, 625.38, 588, 137/846, 847, 234.5, 215, 493.1, 493.2, 493.3, 493.4; 251/322, 325

[56] References Cited

U.S. PATENT DOCUMENTS

| | | |
|---|---|---|
| 281,608 | 7/1883 | Browne . |
| 539,714 | 5/1895 | Walther et al. . |
| 575,552 | 1/1897 | Murphy . |
| 1,126,385 | 1/1915 | Burns . |
| 1,350,109 | 8/1920 | Nystrom . |
| 3,060,965 | 10/1962 | Taggart ............................ 137/599.2 |
| 3,086,677 | 4/1963 | Konchan ............................ 137/493.4 |
| 3,148,860 | 9/1964 | Morris ............................ 137/599.2 X |
| 3,463,346 | 8/1969 | Mitchell ............................ 137/493.2 |
| 3,631,877 | 1/1972 | Barosko ............................ 137/588 X |
| 3,861,557 | 1/1975 | Tupper ............................ 220/110 |
| 3,927,690 | 12/1975 | Agren ............................ 137/492 |
| 3,941,149 | 3/1976 | Mittleman ............................ 137/493 |
| 3,945,395 | 3/1976 | Reinicke et al. ............................ 137/84 |
| 4,023,415 | 5/1977 | Garcia ............................ 73/50 |
| 4,077,429 | 3/1978 | Kimball ............................ 137/588 |
| 4,165,816 | 8/1979 | Tupper ............................ 220/320 |
| 4,182,356 | 1/1980 | Woodford, Sr. ............................ 137/111 |
| 4,458,711 | 7/1984 | Flider ............................ 137/846 |
| 4,474,211 | 10/1984 | Lucas ............................ 137/150 |
| 4,497,468 | 2/1985 | Hubbard et al. ............................ 251/322 |

*Primary Examiner*—Stephen M. Hepperle
*Attorney, Agent, or Firm*—Wood, Dalton, Phillips, Mason & Rowe

[57] ABSTRACT

A pressure relief and vacuum vent valve includes a valve body defining a cylinder having an inwardly facing valve seat. A valve piston is positioned in the cylinder and includes an annular closure portion axially movable toward and away from the valve seat to close and open the valve. The piston has an axial bore. A spring, of considerable rate, urges the valve piston closure portion toward the valve seat. The piston is selectively movable axially against the spring to open the valve and release pressure from within the valve body. A flexible duckbill vent valve is integral with the valve piston within the bore and opens inwardly for venting fluid therethrough only in response to vacuum within the valve body.

19 Claims, 2 Drawing Sheets

PRESSURE RELIEF AND VACUUM VENT VALVE

FIELD OF THE INVENTION

This invention relates generally to fluid control valves and, more particularly, the invention is directed to a single valve assembly which provides for both pressure relief and vacuum breaking or venting.

BACKGROUND OF THE INVENTION

Pressure relief valves and vacuum venting valves have been used in various environments wherein some sort of chamber must be provided with a vacuum venting capability, such as during a period of operation, as well as means for relieving pressure build-up within the chamber should that be desired. One such application is in an integrated drive generator which consists of a gear differential with speed trimming hydraulic units, referred to as a constant speed drive, connected to a generator. The accessory integrated drive generator is coupled to the main aircraft engine and receives a variable speed input. The constant speed drive converts this input to a constant output speed. The mating generator utilizes the constant speed to produce a constant frequency electrical power output.

Heretofore, such integrated drive generators and similar electrical power generating systems most often have used separate valves to accomplish the "pressure relief" and "vacuum break" or venting functions. The vacuum break valve conventionally has been embodied in a vacuum break plug which operates with a sensitive or light spring design. The pressure relief valve has taken the form of various spring loaded valve assemblies which are selectively operable or actuated to release pressure within the constant speed drive and/or generator. Attempts have been made to incorporate both valves into a single assembly, but, in essence, both valves operate independently and include separately movable valve components.

Such valves are necessary for proper operation of the integrated drive generator. Specifically, during start-up of the device, vacuum is created and vacuum venting is required to equalize pressure within the device. During start-up vacuum is created by the transference of oil from the case to a pressurized external circuit and a charge pressure circuit within the integrated drive generator. The oil transfer is accomplished by the rotating pump elements. This vacuum is replaced with ambient pressure air allowed to pass over the vacuum break valve and into the case. With continued operation, air within the closed system is not allowed to exit. The oil expands due to an increase in temperature associated with operating conditions. The air within the closed system is compressed as a result of the previous events and a pressure head is created. The pressure head promotes filling the pumps within the integrated drive generator. In particular, this pressure head is used by the integrated drive generator designer to optimize the output quantities of the required high speed hydraulic pumps. The ensurance of proper pump inlet filling further serves to reduce premature life reduction due to cavitation and/or erosion of the pump elements. When maintenance or repairs are required, means must be provided to relieve the pressure head. The relief of this pressure head prevents any uncontrolled loss of fluid. Uncontrolled fluid loss, often at high temperature, from the integrated drive generator may be injurious to maintenance personnel.

The above parameters are critical when using such devices in aircraft applications. One of the major problems arises during conditions of extreme vibrations. If a valve to the integrated drive generator, such as the vacuum break valve, vibrates open, air can seep out of the device and diminish pumping capability. If the valve is constructed with separate movable components, including light spring/piston configurations, the problem of vibration can become critical. In addition, debris from a hostile environment can accumulate on the separate valve components and valve seats during the vacuum conditions of start-up and thereby cause subsequent leakage because of the extremely low seating force of the light springs.

This invention is directed to solving the above problems by providing a pressure relief valve which has a constituent vacuum vent valve component which is not subject to opening during vibrations and is not prone to accumulation of foreign matter. The pressure relief valve is biased with a spring of considerable rate to prevent unwarranted unseating during vibration. Minor debris accumulation does not inhibit the valve's ability to provide proper sealing due to the use of said spring. The valve assembly is simple in operation, cost effective and maintenance free.

SUMMARY OF THE INVENTION

An object, therefore, of the invention is to provide a new and improved pressure relief and vacuum vent valve of the character described.

In the exemplary embodiment of the invention, the valve generally includes a valve body having means defining a valve seat. A valve assembly is mounted on the valve body and includes a closure portion movable toward and away from the valve seat to close and open the valve. Biasing means is provided for urging the closure portion toward the valve seat to close the valve. The valve assembly is selectively operable to open the valve and release pressure from within the valve body. Conduit means are provided through the valve assembly, and a flexible vent valve is fixed to the valve assembly in the conduit means for venting the valve only in response to vacuum within the valve body.

Specifically, the valve body defines a cylinder which includes an inwardly facing annular valve seat. The valve assembly comprises a piston positioned in the cylinder and including an outwardly facing annular closure portion in the form of a flange axially movable toward and away from the annular valve seat. A coil spring of considerable rate is disposed between the flange and the valve body for biasing the valve to closed position and preventing unseating during vibration and/or due to debris presence. The piston is selectively movable axially against the coil spring to open the valve and release pressure from therewithin. The piston has an axial bore, and a duckbill-type valve is fixed to the valve piston assembly within the bore and opening inwardly for venting fluid therethrough only in response to vacuum within the valve body. The duckbill valve has a flange portion in the piston bore, and venting conduit means extend axially through to the piston stem and radially through the valve body. The constituent piston stem, which retains the duckbill valve within the valve piston, projects axially outwardly of the valve body for axially moving the valve piston to open the valve and relieve the pressure therewithin.

Other objects, features and advantages of the invention will become apparent from the following specification taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DESCRIPTION OF THE PREFERRED EMBODIMENT

Figure 1:
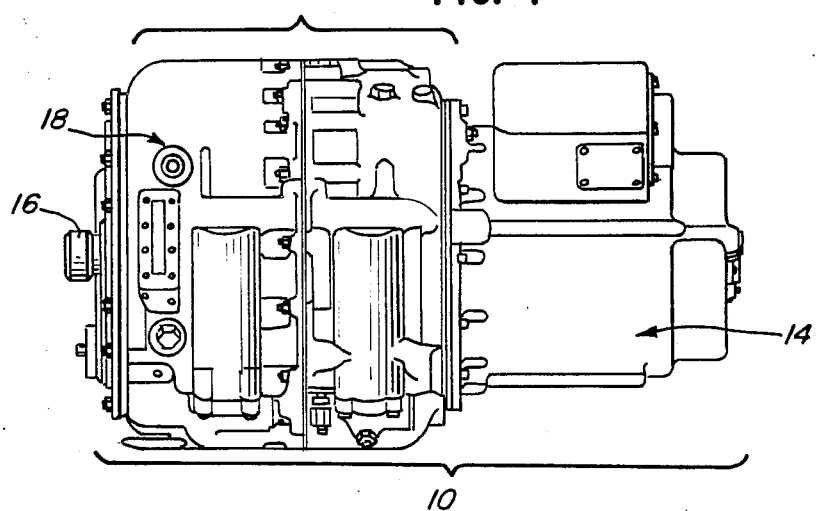
FIG. 1 is an elevational view of an integrated drive generator embodying the valve of the invention.

Referring to the drawings in greater detail, and first to FIG. 1, the invention is illustrated herein for use in an integrated drive generator and/or any other such similar device, generally designated 10, which includes a constant speed drive, generally designated 12, coupled to a generator, generally designated 14. The constant speed drive 12 has an input 16 which receives a variable speed from the turbine of an aircraft engine. The constant speed drive 12 converts the variable speed to a constant speed output, such as 12,000 rpm, to generator 14 which has, for instance, a 115 volt, 400 Hz. frequency output. In essence, integrated drive generator 10 is mounted to the aircraft's accessory drive gearbox for receiving the variable speed input from the main aircraft engine and converting that speed into a constant power output to drive selected accessories of the aircraft.

Constant speed drive 12 contains conventional pump elements which build up a pressure head by rotation thereof to power the required speed trimming hydraulic units and retrieve internal leakage oil within the integrated drive generator. During start-up, a vacuum is created within the constant speed drive by the pump elements' rotation. This vacuum must be vented and a positive pressure head must occur to avoid cavitation of the pump elements. Therefore, a vacuum vent valve must be incorporated. In addition, for maintenance or service purposes, there must be a capability of relieving the pressure head from within the integrated drive generator. To this end, the invention contemplates a novel, single pressure relief and vacuum vent valve means, generally designated 18, capable of performing these functions.

Figure 2:
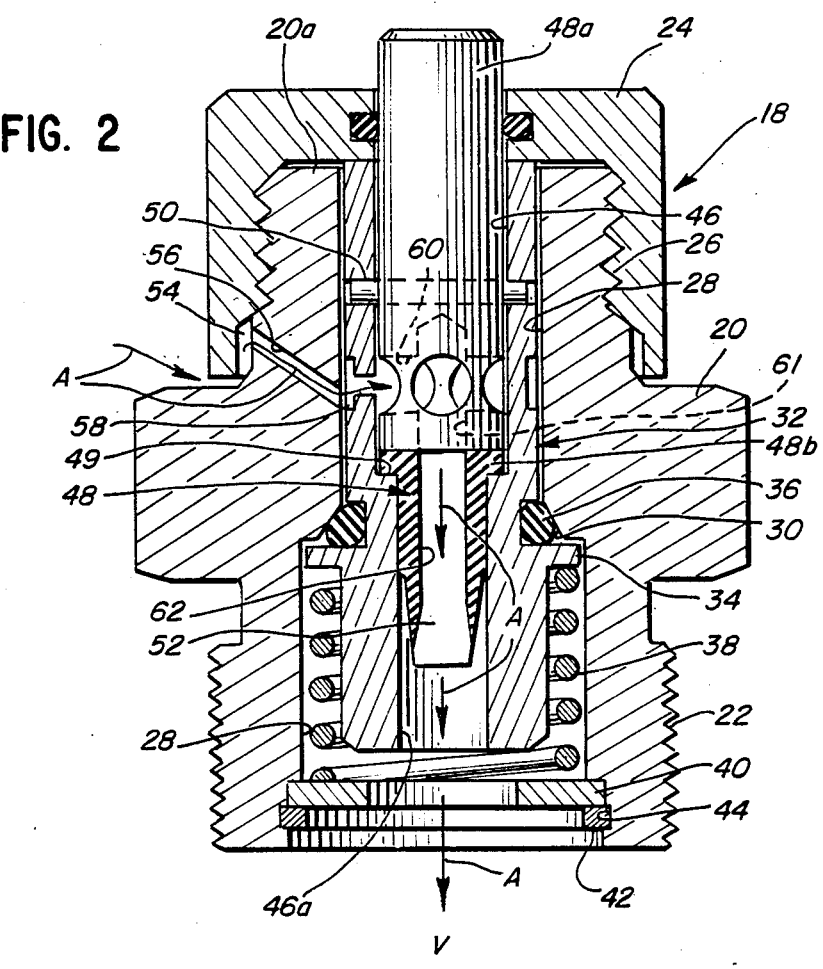
FIG. 2 is a fragmented axial section, on an enlarged scale, of the pressure relief and vacuum vent valve of the invention, in condition for vacuum venting the generator.
Figure 3:
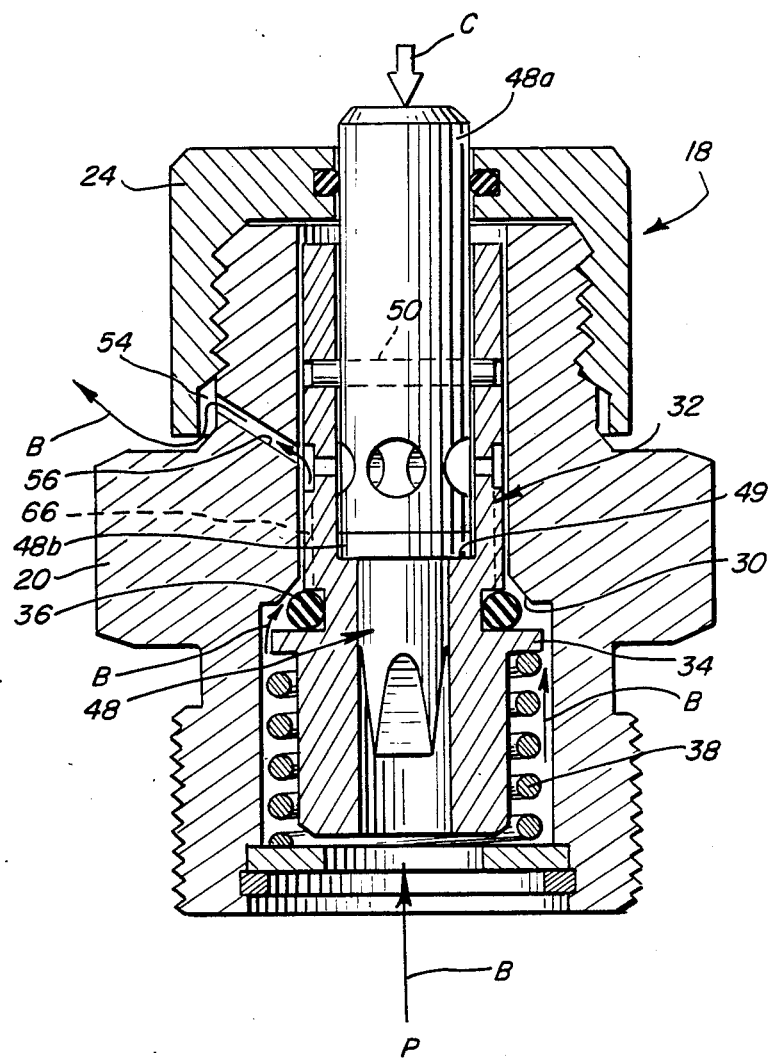
FIG. 3 is an axial section similar to that of FIG. 2, with the valve in pressure relief condition.

More particularly, pressure relief and vacuum vent valve 18 is illustrated in FIGS. 2 and 3. FIG. 2 illustrates the valve in condition for vacuum breaking or venting as illustrated by arrows "A". FIG. 3 illustrates the valve in condition for selective pressure relief as indicated by arrows "B".

Valve 18 includes a valve body 20 having an exteriorly threaded lower portion 22 for threading into a complementarily internally threaded bore in the housing of constant speed drive 12. A cap 24 is threaded, as at 26, onto an upstanding stem portion 20a of valve body 20. The valve body defines an axial cylinder 28 which has a reduced diameter inclined portion 30 defining a valve seat.

A valve piston assembly, generally designated 32, is positioned in cylinder 28 and includes an outwardly facing annular flange 34 defining a closure portion axially movable toward and away from valve seat 30 to close and open the valve. To promote effective closure, a flexible O-ring 36 is sandwiched between valve closure flange 34 and valve seat 30.

Biasing means in the form of a coil spring 38, of considerable rate, is disposed about the lower portion of valve piston assembly 32 and is sandwiched between valve closure flange 34 and a washer 40 which is held in position by a retaining ring 42 snapped into an annular groove 44 within the lower end of cylinder 28. The coil spring urges valve piston assembly 32 outwardly (upwardly in the drawings) to compress O-ring 36 against valve seat 30 to maintain the valve in closed condition as illustrated in FIG. 2.

The single valve assembly 18 also has vacuum break or vent valve means for venting the constant speed drive 12, for instance during start-up as described above. More particularly, valve piston 32 includes an axial bore 46 including a lower reduced-diameter portion 46a. A flexible vent valve, generally designated 48 and including a piston stem 48a, is positioned within bore 46,46a. A flange 48b of valve 48 is held against seating surface 49 of piston 32 by piston stem 48a, which is retained by a cross pin 50, whereby the valve piston assembly comprises a unitary structure embodying vent valve 48 which moves with the piston assembly as an integral part thereof. Vent valve 48 is a duckbill valve fabricated of flexible material and includes a lower portion defining opening lips 52.

Conduit means are provided through valve 18 communicating between the interior of constant speed drive 12 and ambient. More particularly, starting from the exterior of the valve, a space 54 is defined between cap 24 and valve body 20. This space is in communication with a radial passageway 56 extending through the valve body. Passageway 56, in turn, is in communication with a radial passageway 58 through piston 32. Passageway 58 is generally T-shaped, as illustrated, so as to be in constant communication with passageway 56 regardless of axial movement of the valve piston assembly. In addition, passageway 58 may extend circumferentially about the piston assembly a sufficient distance to accommodate any unintentional rotation of the piston assembly. Passageway 58 is in communication with one or more radial passageways 60 through the piston stem 48a, in turn, in communication with an axial passageway 61, which in turn is in communication with an axial passageway portion 62 extending through the lips of duckbill valve 48 and into the chamber of the constant speed drive 12.

In venting condition of valve 18, such as during start-up, vacuum venting is effected through the conduit means described above in relationship to passageways 54,56,58,60,61,62 and as indicated by arrows "A" in FIG. 2. This will permit the build-up of a pressure head within the constant speed drive. It can immediately be seen that the duckbill valve does not have any movable parts in the context of physically moving in relation to the other components of valve piston 32. The lips of the duckbill valve are not prone to opening during conditions of high vibration and since there are no separately operable valve components, springs, pistons and valve seats, foreign matter is not likely to accumulate between the flexible lips of the duckbill valve sufficient to cause leakage.

FIG. 3 illustrates valve 18 in condition for selectively relieving the pressure within constant speed drive 12. More particularly, should service or maintenance need be performed on the integrated drive generator, the pressure head therewithin must be released. This is accomplished by depressing the upper body portion of piston stem 48a as indicated by arrow "C". Since the vent valve 48 is a unitary component of axially movable valve piston assembly 32, the piston assembly is moved inwardly which, in turn, moves closure flange portion 34 and O-ring 36 away from valve seat 30. This opens valve 18 and fluid pressure is released in the direction of arrows "B", around spring 38, around closure flange 34, past valve seat 30, outwardly through passageway 56 in valve body 20, and out through the space 54 between cap 24 and the valve body. Conduit means also may be provided in the form of axial channels 66 cut into the exterior of piston 32. After the pressure head is released, the operator removes the actuating force and coil spring 38 returns the valve to its closed condition as illustrated in FIG. 2.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed:

1. A pressure relief and vacuum vent valve, comprising:
    a valve body including means defining a valve seat;
    a valve assembly positioned in the valve body and including a closure portion movable toward and away from the valve seat to close and open the valve;
    biasing means for urging the valve assembly closure portion toward the valve seat to close the valve;
    actuator means connected to the valve assembly for selectively moving the closure portion to open the valve and release pressure from within the valve body;
    conduit means through the valve assembly and outwardly through the valve body; and
    a flexible vent valve integral with the valve assembly and movable therewith in response to moving the actuator means, the flexible vent valve being located within the conduit means for venting fluid therethrough independently of the closure portion and biasing means only in response to vacuum within the valve body.

2. The valve of claim 1 wherein said flexible vent valve comprises a duckbill valve.

3. The valve of claim 2 wherein said valve seat faces in a given direction and the duckbill valve opens in said direction.

4. The valve of claim 1 wherein said valve body forms a cylinder defining said valve seat thereabout, and the valve assembly comprises a piston with a peripheral closure portion movable axially toward and away from the valve seat.

5. The valve of claim 4 wherein said piston has an axial bore within which said flexible vent valve is fixed.

6. The valve of claim 5 wherein said flexible vent valve comprises a duckbill valve.

7. The valve of claim 6 wherein said conduit means extends radially through the valve body and the valve piston assembly in communication with the bore and the flexible vent valve.

8. The valve of claim 4 wherein the valve piston assembly has an actuator portion projecting outwardly from one end of the cylinder for selectively moving the piston to open the valve.

9. The valve of claim 4 wherein said piston has an annular, radially projecting flange defining said closure piston.

10. The valve of claim 9 wherein one side of the flange defines said closure portion, and said biasing means is biased against the opposite side of the flange.

11. The valve of claim 9, including a resilient O-ring between the flange and the valve seat.

12. A pressure relief and vacuum vent valve, comprising:
    a valve body defining a cylinder which includes an inwardly facing annular valve seat;
    a valve piston assembly positioned in the cylinder and including an outwardly facing annular closure portion axially movable toward and away from the valve seat to close and open the valve, the piston assembly having an axial bore;
    biasing means for urging the valve piston assembly closure portion toward the valve seat;
    actuator means connected to the valve piston assembly for selectively moving the closure portion to open the valve and release pressure from within the valve body;
    conduit means through the valve piston assembly, in communication with said bore, and outwardly through the valve body; and
    a flexible vent valve integral with the valve piston assembly and movable therewith in response to moving the actuator means, the flexible vent valve being located within the bore and opening inwardly for venting fluid therethrough, independently of the closure portion and biasing means only in response to vacuum within the valve body.

13. The valve of claim 12 wherein said flexible vent valve comprises a duckbill valve with the lips thereof facing inwardly axially of the valve piston assembly.

14. The valve of claim 13 wherein the duckbill valve is seated against an axial bore seat of the valve piston assembly by a piston stem which projects outwardly of the valve body for axially moving the valve piston assembly to open the valve.

15. The valve of claim 12 wherein said closure portion is defined by an annular flange projecting radially outwardly of the valve piston assembly.

16. The valve of claim 15 wherein said biasing means comprises a coil spring of considerable rate sandwiched between said flange and a portion of the valve body.

17. The valve of claim 15 wherein the valve seat is defined by a reduced diameter portion of the cylinder forming a shoulder facing the flange.

18. The valve of claim 17, including a resilient O-ring between the shoulder and the flange.

19. The valve of claim 12, including fluid passage means on the outside of the piston assembly communicating with the valve seat.

* * * * *